United States Patent [19]

Guinon et al.

[11] Patent Number: 4,550,414

[45] Date of Patent: Oct. 29, 1985

[54] SPREAD SPECTRUM ADAPTIVE CODE TRACKER

[75] Inventors: Walter J. Guinon, Newburyport; Richard H. Lamb, Jr., Somerville, both of Mass.

[73] Assignee: Charles Stark Draper Laboratory, Inc., Cambridge, Mass.

[21] Appl. No.: 484,302

[22] Filed: Apr. 12, 1983

[51] Int. Cl.[4] ........................................... H04B 15/00
[52] U.S. Cl. ......................................... 375/1; 364/819
[58] Field of Search ................. 375/1, 96; 364/728, 364/819, 824; 343/368, 371, 372, 375, 378

[56] References Cited

U.S. PATENT DOCUMENTS

| | | | |
|---|---|---|---|
| 4,222,115 | 9/1980 | Cooper et al. | 375/1 |
| 4,236,159 | 11/1980 | Alpers | 343/378 |
| 4,346,475 | 8/1982 | Alexis | 375/1 |
| 4,442,433 | 4/1984 | Myers et al. | 343/378 |

Primary Examiner—Benedict V. Safourek
Attorney, Agent, or Firm—Weingarten, Schurgin, Gagnebin & Hayes

[57] ABSTRACT

A pseudo-noise code-tracking spread spectrum receiver able to quickly acquire and track incoming signals includes an adaptive weighting system for the outputs of parallel-fed correlator channels in which the weighting system automatically detects the degree of correlation in each channel, sets the detector characteristic to increase the weight for a correlator channel exhibiting a high degree of correlation, and decreases to zero the weights on all others.

11 Claims, 6 Drawing Figures

SPREAD SPECTRUM ADAPTIVE CODE TRACKER

FIELD OF INVENTION

This invention relates to spread spectrum receivers and more particularly to a method and apparatus for improving the signal acquisition and tracking of a spread spectrum receiver.

BACKGROUND OF THE INVENTION

Present communication systems currently employ pseudo-noise (PN) spread spectrum modulation. The purpose of the spread spectrum modulation depends on the particular application. Such communication systems can be utilized for purposes of security, anti-jam protection, multiple access capability, or a safe level of power flux density radiated back to earth. Regardless of the application, the problems of acquiring and tracking the PN code are paramount in all these systems. In order to optimize a system, the code is to be acquired in as short a time as possible.

In communications systems utilizing pseudo-noise sequences or codes in their signals, it is a requisite that the phase of the receiver's code sequence be synchronized to that of the transmitted sequence. It is therefore the purpose of a code tracker within a spread spectrum receiver to seek out this phase and follow it by providing the appropriately phased replica of the code to the decoder unit within the spread spectrum receiver. When the incoming coded signal is correlated with the appropriately phased replica at the receiver, the information on the transmitted signal may be read out.

As used herein, a spread spectrum system is one in which the transmitted signal is spread over a wide frequency band, much wider in fact than the minimum band width required to transmit the information being sent. Three general types of modulations produce spread spectrum signals, e.g. (1) Modulation of a carrier by a digital code sequence whose bit rate is much higher than the information signal bandwidth. Such systems are called "direct sequence" modulated systems; (2) Carrier frequency shifting in discrete increments in a pattern dictated by a code sequence. These are called "frequency hoppers." The transmitter jumps from frequency to frequency within some predetermined set, with the order of frequency usage being determined by a code sequence; and (3) Pulsed-FM or "chirp" modulation in which a carrier is swept over a wide band during a given pulse interval.

The term "pseudo-noise" mentioned above refers to a predetermined apparently random pulse sequence having a recurring period or cycle which is long compared with a prevailing information or message duration. This pseudo-random pulse sequence is usually used in a direct sequence system which, in the biphase phase shift keyed embodiment, involves a carrier which is 180° phase-shifted in accordance with the output of a pseudo-random-number code generator. Thus the incoming signal consists of a sequence of phase transitions from one constant value to another. In one system, these transitions occur at a fixed frequency, with the period of the transitions being referred to as one "chip." Of particular interest in many applications is the binary, pseudo-random-number code which consists of a pseudo-randomly generated sequence of numbers having a value of $+1$ or $-1$. A pseudo-random-number code is one which is derived from a sequence which can be generated systematically but which has some of the properties of a random-number sequence. Pseudo-random codes are well known and are of practical interest since a receiver which is capable of generating the pseudo-random-number code sequence can lock onto a pseudo-random-number code signal which looks to other receivers like noise. At the same time, spurious signals which may accompany the incoming pseudo-random-number code signal (as, for example, spurious signals generated by thermal noise or external interfering signals) will appear as noise to the receiver and may be rejected by proper filtering techniques. Since pseudo-randomly coded spread spectrum signals look like noise when received by a conventional receiver, the class of receivers which detect spread spectrum pseudo-random-number codes are called pseudo-noise (PN) spread-spectrum receivers.

U.S. Pat. Nos. 3,305,636; 3,350,644; 3,402,265; 3,439,279; 3,629,505; 3,666,889; 3,852,354; 4,007,330; 4,017,798; 4,039,749; 4,048,563; 4,092,601; 4,122,393; 4,203,071; 4,214,209; and 4,221,005 described various correlator systems for providing the appropriately phased replica of the PN code to be used in the decoders of the spread spectrum receivers.

For parallel-correlator systems, a bank of correlators is fed with the incoming signal, with each correlator channel being provided with progressively advanced and retarded versions of a local PN code generator sequence. This means that each correlator channel is provided with a differently phased replica of the predetermined pseudo-noise code. Were it not for noise in the system, the correlator channel having the highest correlation output would indicate which of the differently phased replicas is the one which matches the phase of the transmitted code. However, Doppler shifts, propagation disturbances and interference result in more than one correlator channel having a high correlation value. In order to determine which correlator channel is the one identifying the appropriately phased replica, various delay-locked loop and integration or averaging techniques are utilized. While all of the prior art signal acquisition and tracking systems can acquire and lock up to the appropriately phased replica, excessive lock-up time precludes the use of these systems where the phase of the incoming signal rapidly changes. This problem is particularly severe in communication with fast-moving vehicles such as jet aircraft, rockets, and nonsynchronous satellites.

In the past, fixed weighting systems have been utilized in which each individual correlator channel is provided with a predetermined weight depending upon certain a priori considerations, such as slant range to the transmitting satellite, Doppler shift, and known atmospheric effects. From this a priori information, it can be ascertained which channel or channels have a high probability of being those channel or channels associated with the correctly phased replica. Once having ascertained these channels with a priori knowledge, their outputs may be given increased weights, whereas other channels are given decreased weights. However, all fixed weighting systems suffer from non-adaptive assigning of weights.

In an attempt to decrease signal acquisition time of the fixed weighting systems, the sharpness of the detector characteristic is adjusted depending on the noise conditions and the probability distribution of signal phase. If relatively little knowledge is available with respect to which probabilities can be calculated, the detector characteristic is relatively flat to permit signal acquisition by a large number of correlator channels. This is equivalent to extending the acquisition range of the receiver by extending the detector response. As more information becomes available as to the incoming signal, the detector characteristic is narrowed so as to effectively reduce the number of correlator channels and thus the receiver range. Change of detector range can be accomplished by adding or decreasing shift register bits for the shift register used to generate the phased replicas. Alternatively this can be accomplished by changing the correlation channel weights making up the nonlinear detector characteristic. This latter type of system is described in detail in the aforementioned U.S. Pat. No. 4,203,071 issued May 13, 1980 to W. M. Bowles, D. B. Cox, Jr., and W. J. Guinon, assigned to the assignee thereof and incorporated herein by reference. This patent describes a detection and tracking system which permits rapid acquisition but does not involve adaptive tracking or combined adaptive acquisition and adaptive tracking since it relies solely on statistical methods of computing error. In short, no signal sampling is used to automatically adjust weights. Moreover, the weights are not adjusted to enhance the weight of a channel which is established as having a high correlation value.

One of the aforementioned patents, U.S. Pat. No. 4,007,330, describes a system for accommodating Doppler shifts by a correction system which selects among three correlator channels according to correlation. Here the incoming signal is delayed by different amounts and then correlated with a predetermined signal, with the correlator channel having the peak correlation identifying the Doppler shift. It will however be appreciated that this system does not utilize adaptive weighting.

SUMMARY OF THE INVENTION

In order to decrease the signal acquisition time and to simultaneously decrease the time it takes for a spread spectrum receiver to lock on or track the incoming signal, a pseudo-noise code-tracking spread spectrum, receiver, having faster tracking dynamics (or increased noise rejection), includes an adaptive weighting system for the outputs of parallel-fed correlator channels. The degree of correlation in each channel is sensed, and the weighting is automatically set to increase the weight for a correlator channel exhibiting a high degree of correlation, and to decrease toward zero the weights on all other channels.

More particularly, this portion of the spread spectrum receiver can be considered to have a detector characteristic that is determined by the weights for the individual correlator channels. The weight distribution for the channels is shaped and determined from a sampled portion of the input signal which exists after the input signal is correlated with an advanced or retarded form of the predetermined code. The advanced or retarded signals constitute phase-shifted replicas.

In order to determine the degree of correlation in each channel and thus the weights for each of the correlator channels, an additional correlator is used. In this additional correlation, the output of the prime correlator for the channel is correlated with a specialized error signal to provide a signal which when integrated by an integrator in the channel is used to determine channel weight. The specialized error signal is composed of a number of error components, each of which is uniquely associated with the channel from which it is derived. Each additional correlator thus recognizes and measures only the component in the specalized error signal that is due to the output of its prime correlator. If there is such a component, this indicates that the weight is wrong, and the associated integrator is driven up or down accordingly to produce the proper weight for the channel.

The specialized error signal fed back to each additional correlator is generated as the sum of the weighted correlator channel outputs subtracted from a training signal, in this case the number "+1" representing perfect correlation. For a "one" correlation in any one of the correlator channels, and with zeros in the other channels, the mean error signal is zero, and all weights are in the steady state.

Lock-up is achieved with near-zero outputs for all but one channel, and a maximum value for the in-phase channel. At regular intervals during acquisition and during tracking, a determination of signal phase is made. This is accomplished by matched filtering the array of correlator channel weights to determine which channel is aligned with the incoming signal. As successive determinations are made, the weights and replicas are simultaneously adjusted to center the detector characteristic about the identified channel. Once an in-phase correlator channel has been identified, the associated replica of the PN code used in this correlation channel is supplied to decode the incoming signal.

The use of the adaptive weighting system obviates the need for the relatively slow delay-locked loop utilized in the prior art and results in faster acquisition and faster tracking, with a given amount of noise immunity. This is because the detector characteristic is at first relatively flat until such time as correlation exists between an incoming signal and the replica supplied to one of the correlator channels. Upon such correlation, this channel is given greater weight, thereby effectively narrowing the detector characteristic. This characteristic is even further narrowed in a dynamic fashion until one correlator channel is identified as that having the maximum correlation to the incoming signal.

Upon identification of a particular correlator channel having a high degree of correlation with the input signal, the associated replica is shifted to the center channel by phase-delaying the replicas to each of the correlator channels and shifting the previously adaptively set weights to the appropriate channels. The tracking thereafter proceeds from a center correlation channel having equal numbers of advanced and retarded phase-replica channels to either side.

While the subject adaptive code tracker will be described in conjunction with direct sequence spread spectrum systems, it will be appreciated that the type of tracking is adaptable to frequency hopping and chirping systems. Moreover, while the direct sequence system described hereinafter is a nonsynchronous system, the subject system can also be utilized to detect synchronizing signals transmitted in a synchronous system, thereby to adjust the phase of the local receiver to the phase of the incoming sync signal.

The advantages of the adaptive code tracker are first that the detector characteristic can be made quite broad, such that the range of the receiver is quite wide. Upon acquisition of a signal, the adaptive weighting system automatically narrows the detector characteristic by increasing the weight on the channels having the highest correlation values. This in turn causes a sharpening of the detector characteristic until one channel is isolated as having a maximum correlation value. At this point, the tracking loop is locked up, and the replica associated with the locked-up correlation channel is then supplied to decode the spread sprectrum signal. Because of the adaptive nature of the subject code tracker, actual signal statistics need not be computed, which allows the subject system to operate robustly in a highly variable signal environment.

The speed of the subject system is established by the relatively short integration time of the integrators which integrate the outputs of the additional correlators.

BRIEF DESCRIPTION OF THE DRAWINGS

These and other features of the subject invention will be better understood in connection with the detailed description taken in conjunction with the drawings of which.

DETAILED DESCRIPTION

Figure 1:
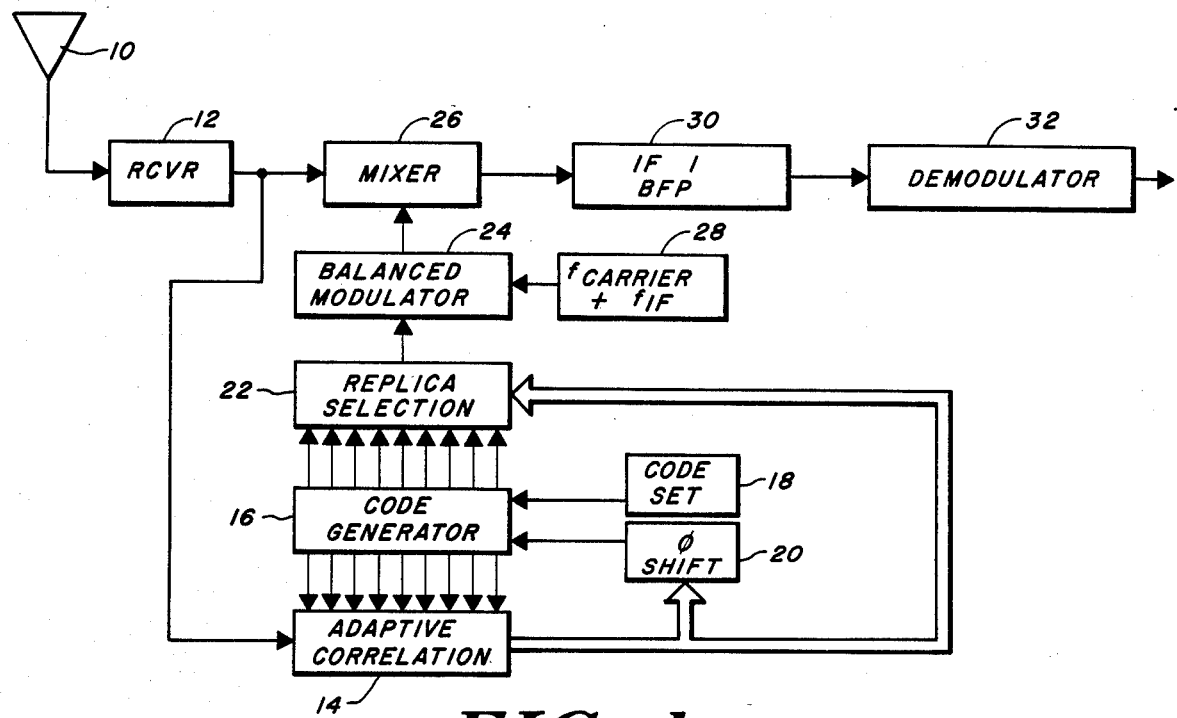
FIG. 1 is a block diagram of a spread spectrum receiver utilizing the subject code tracking system.

Previous methods for achieving synchronization have included so-called sliding correlators for phase acquisition and either a tau-dither loop or a delay-locked loop for tracking. The sliding correlator steps the phase of the local replica of the transmitted code and measures the correlation at each step between the replica and incoming signal. Acquisition is indicated when the above measurements exceed some threshold, after which the tracking loop takes control. A disadvantage of the sliding correlator is that only one correlator is used to search out the proper code phase. Thus this is not a system in which correlator channels are fed in parallel. If a code has a repetition rate of N clock periods and the time required for each correlation measurement is T, it takes at worst NT seconds to acquire the code, assuming that no false indications occur due to excessive noise. Such a false indication requires additional time to dismiss the false alarm and resume code search.

With respect to systems involving parallel-fed correlator channels, the combined output of two or more parallel correlators drives a delay-locked loop, with the correlators being driven by earlier and later versions of the code sequence. The sum of the outputs of the correlators is used as an error signal which is used to change the phase of the code replicas to eventually drive the difference between the replica and the received code to zero. Other delay-locked loop systems include a so-called extended range detector of U.S. Pat. No. 4,203,071 which operates much like the delay-locked loop in the sense that the outputs of a number of correlators are driven by delayed replicas. However, the extended range detection-type systems utilize fixed weights in which the outputs of the correlator channels are weighted according to a priori information depending on the projected noise variance of the incoming signal, and signal dynamics induced by line of sight motions.

The tau-dither loop uses a single correlator and derives an error signal by phase-modulating the replica over a small range which is a fraction of the code clock period or chip. The correlator output is then demodulated and averaged. The averaging is in the form of an integration which takes a considerable amount of time.

The delay-locked loop and tau-dither loop systems have the further drawback of requiring the initial code phase error to be within one clock period or chip for subsequent tracking to take place. Also, if tracking errors become greater than one chip, no error signal obtains and tracking ceases.

The principal disadvantage of the extended range detector is the need to predict the noise variance statistic from the signal before the weights can be chosen. It should be noted that in both the delay-locked loop and the extendedrange detectors the weighting system is tailored through the use of a priori knowledge to give the detector a predetermined nonlinear characteristic as opposed to being adaptively set based on incoming samples of the signal plus noise.

A system for rapidly acquiring and tracking the spread-spectrum signal by using adaptive weighting is now discussed. Referring now to FIG. 1, the receiving portion of a spread spectrum system includes an antenna 10 which receives the spread spectrum signals, the output of which is coupled to a conventional receiver 12, which amplifies the incoming signal. The output of receiver 12 is coupled to a correlation unit 14 which is supplied with a number of phase-delayed replicas of a predetermined code generated by a code generator 16, the initial phase of which is set by a code set unit 18. A phase-shifter 20 is utilized to shift the phase of the replicas generated by code generator 16. Initially the phase shift unit 20 is set to zero.

The output of the code generator 16 is also applied to a replica selection unit 22 which selects which of the replicas generated by code generator 16 is to be applied to a balanced modulator 24 and thence to a mixer 26, the input of which is coupled to the output of receiver 12. The other input to balanced modulator 24 is a signal generator 28 which generates $f_{carrier} \pm f_{IF}$. The output of mixer 26 is applied to an IF bandpass filter 30 which is in turn coupled to a conventional demodulator 32 which demodulates the information on the received signal.

In operation, an incoming signal is simultaneously correlated with each of the phase-delayed replicas from code generator 16, and as will be described in connection with FIG. 3, the weights on the correlator channel outputs are adaptively changed such that increased weights are given to the outputs of correlator channels having higher degrees of signal correlation, with reduced weights being given to those channels having lower correlation values, the weighting for each of the parallel-fed correlation channels being adaptively determined. Lock-up is achieved when a particular channel is identified as having a maximum correlation value, in one embodiment in terms of the weight for a channel exceeding a predetermined threshold, in another embodiment by matched filtering the array output.

A matched filter is that filter whose impulse response is the time reverse of the expected signal waveform. That is, the filter is "matched" to the incoming signal. The matched filter is the optimal linear filter in that it maximizes the output signal-to-noise ratio at the arrival time of the expected signal.

In practice, the sequence of weights across the bank of correlators may be filtered by a matched filter whose impulse response is the auto-correlation of the incoming signal. This auto-correlation is usually known a priori as a property of the incoming signal. As discussed in connection with FIG. 5, in the case of direct sequence coding the auto-correlation is triangular.

The occurrence of the matched filter's output maximum identifies the correlator most likely to be aligned with the desired signal. Lock-up therefore establishes the in-phase replica, and this identified replica is selected by replica selection circuit 22 to be applied to balanced modulator 24, such that when the output of the balanced modulator is applied to mixer 26, the received signal is decoded, with the information of the decoded signal then being passed to the IF bandpass filter and demodulator for demodulating the information on the decoded signal.

It is advantageous to use a matched filter when the signal auto-correlation is broad enough so that more than one correlator is temporally aligned with the incoming signal. This would be the case for instance if the local reference waveforms which feed the correlators are related by small time shifts, i.e. they are close together with respect to the auto-correlation of the incoming waveform.

For a PN code, the width of the auto-correlation is the time of one chip of the PN code. Thus if the required tracking precision is a fractional chip, it is necessary to space the reference waveforms closer than one chip, leading to partial correlations in correlators adjacent to the main peak. In this sense, the matched filter serves to take this signal energy (partial correlations in adjacent correlators) and compress it into a single peak.

After lock-up, the phase of the replicas generated by code generator 16 is shifted such that the channel having been identified as that carrying the in-phase replica is shifted to the center such that equal numbers of channels carrying advanced and retarded replicas are on either side thereof. Concomitantly therewith, the weights existing at lock-up are shifted to the corresponding channels as the channels are phase-shifted, such that the detector characteristic existing at lock-up is preserved during the centering of the in-phase replica channel.

It will be appreciated that if the replicas alone were shifted to center the in-phase replica, immediately after the moment of shift, the in-phase replica would be in the center of the bank of correlators, but with nominally zero weight. This would necessitate another acquisition cycle where the weight previously associated with the in-phase replica relaxed to zero, and the center weight rose to its maximum. This transient effect is avoided if the weights associated with each replica are shifted between channels along with that replica.

Figure 2:
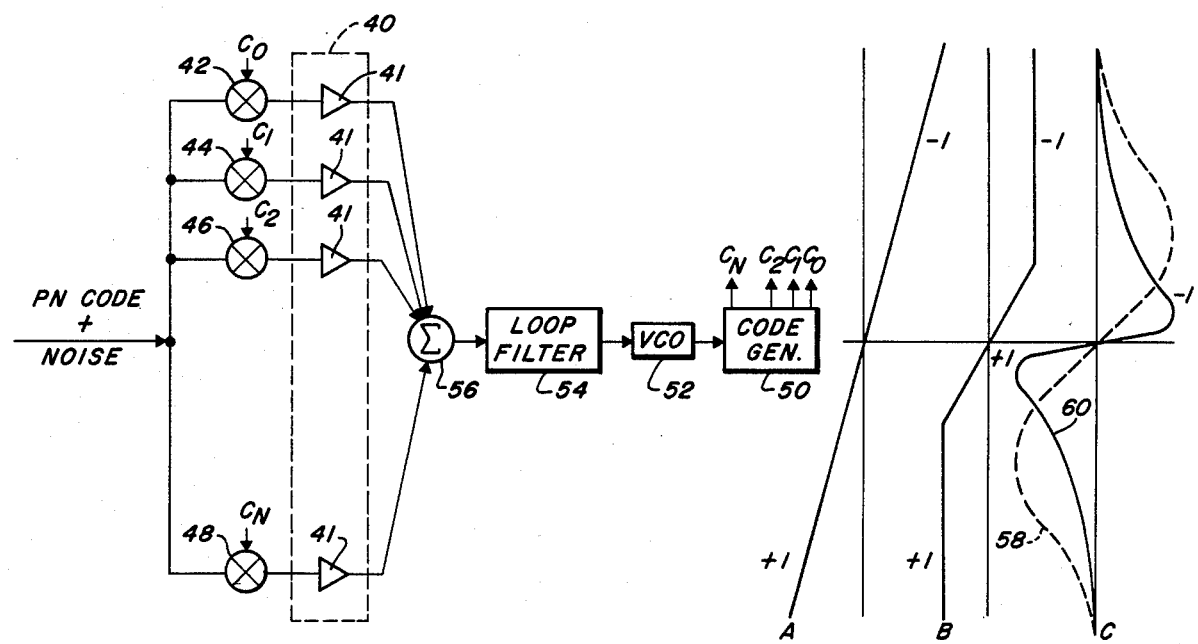
FIG. 2 is a schematic and waveform diagram illustrating a fixed weighted delay-locked loop tracking system in which the weights are set by a priori information.

Referring now to FIG. 2, a prior art delay-locked loop system is illustrated in which the weights for the correlation channels are set by a fixed weighting system generally indicated at dotted box 40 to include weighting amplifiers or attenuators 41. A PN code plus noise is fed in parallel to the inputs of correlation channels defined by correlators 42, 44, 46, and 48. The channels are supplied respectively with phase-shifted code replicas $C_0, C_1, C_2, \ldots C_N$. These code replicas are generated by code generator 50 which is controlled by a voltage-controlled oscillator 52 which is in turn fed from the output of a loop filter 54, the input of which is the sum of the outputs of the weighted correlator channels provided by summer 56.

It will be appreciated that the outputs of the indicated channels include a correlation value multiplied by the associated weight plus the noise in the channel. As will be seen, the larger the number of channels, the lower is the signal-to-noise ratio for the system, or the longer it takes the system to lock up. The output of summer 56 being applied to loop filter 54 integrates out the noise and provides that the voltage-controlled oscillator (VCO) be tuned in accordance with the error signal provided at the output of the loop filter. Thus the VCO is tuned to bring the center correlator into closer phase alignment with the PN coded signal. It will be appreciated that the loop filter has an exceptionally long integration time in order to eliminate the effects of noise from the system. The more correlation channels utilized, the higher the noise value, and therefore the longer the integration time necessary in order to provide lock-up, or tracking to a given degree of accuracy.

As illustrated to the right of the diagram of FIG. 2, various fixed weighting schemes are utilized in tailoring the weights provided by amplifiers 41. As illustrated by waveform A, a linear weighting system may be utilized which gives increased weight to the correlation channels associated with the most advanced or retarded phase-shifted replicas. This results in an increased weighting signal for correlations at the most advanced and retarded phase replica positions, which in turn causes the VCO to shift the system either upwardly or downwardly so that the channel aligned with the PN code is finally centered in the sense that it is the center correlation channel or $C_{N/2}$. The linear characteristic is not an optimal characteristic, and a discontinuous linear characteristic may be more useful, such as the one shown as waveform B. Although a linear shape is more appealing from a control theory standpoint, in the presence of radio noise it has a higher mean squared error than certain other shapes. This is due to the large multipliers associated with extreme weights.

The distribution of waveform C is a preferred weighting system for the correlator system of FIG. 2. As illustrated by dotted waveform 58, the correlator may originally be given a relatively flat characteristic so as to accommodate large initial misalignment. As the system approaches alignment, the fixed weightings may again be refixed to give the sharper characteristic illustrated by solid lines 60, which gives increased weighting to the central channels of the correlator while giving decreased weighting to the outlying channels. The change of detector characteristic from that shown by dotted line 58 to that shown by dotted line 60 is governed by a priori information, and is not adaptive in the present sense in which signal sampling results in automatic adjustment of the weight values. Thus all of the weighting techniques described by waveforms A, B, and C are fixed weighting systems, whether or not they are adjusted after some time to change the characteristic. In all cases of the prior art delay-locked or tau-dither systems, the weighting system is fixed by a priori information and not by any adaptive techniques.

Figures 3, 4:
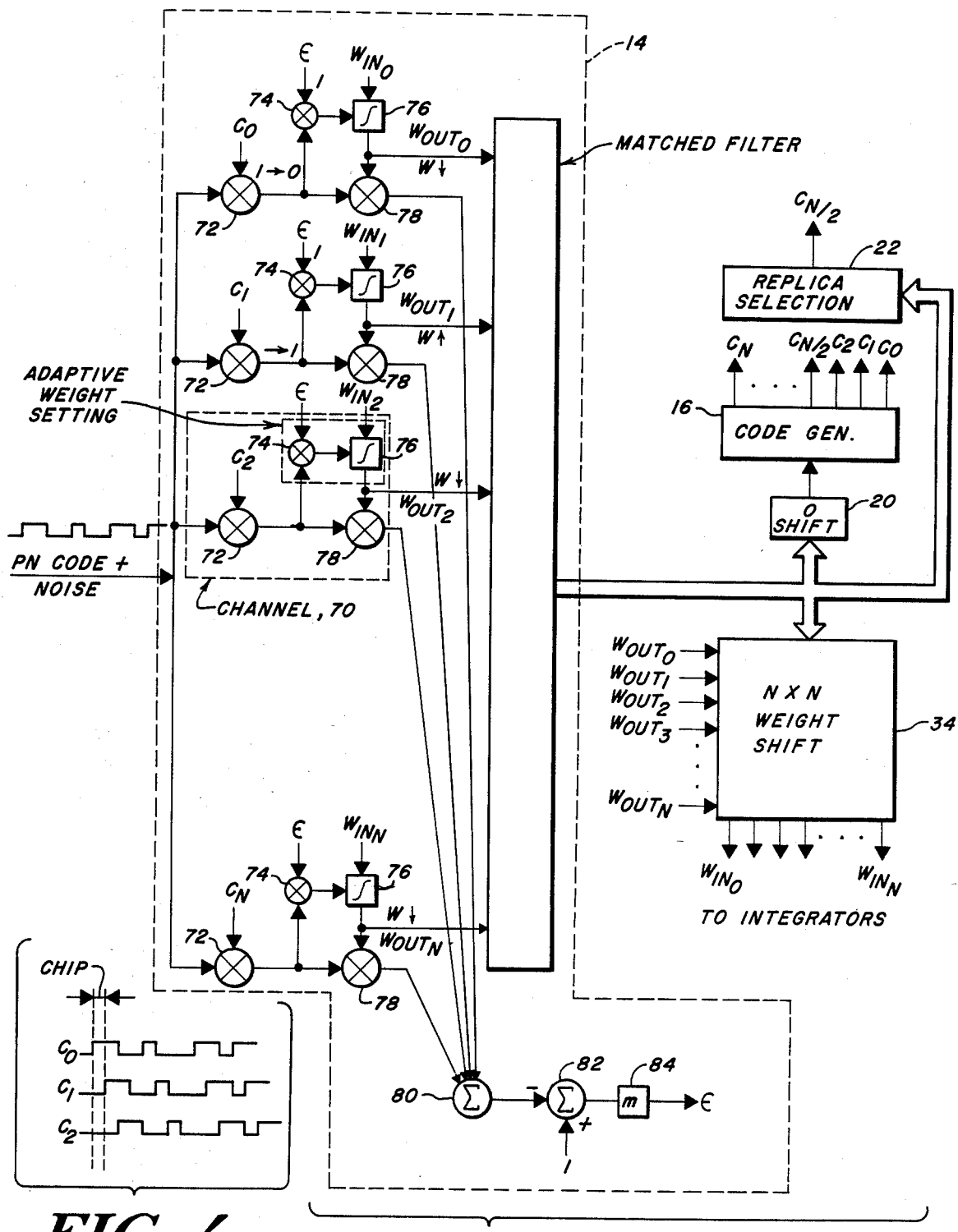
FIG. 3 is a schematic diagram of the subject code tracking system for utilization in the spread spectrum receiver of FIG. 1, illustrating adaptive weight setting through the utilization of an additional correlation and integration step for each correlator channel.
FIG. 4 is a waveform diagram illustrating the amount of phase shifting utilized in phase shifting the code replicas for use in the code tracking system of FIG. 3.

Referring now to FIG. 3 in which like reference characters are used with respect to FIGS. 1 and 3, correlator 14 is provided with a number of correlation channels 70, each provided with a primary correlator 72 and an additional correlator 74. It is the purpose of the primary correlators to correlate the incoming signal with an appropriately delayed replica of a predetermined code, with the replicas herein being labeled $C_0$, $C_1$, $C_2$, ... $C_N$. The output of each of correlators 72 is provided as one input to the associated additional correlator 74, the other input thereto being an error signal E, the derivation of which will be described hereinafter. The output of each additional correlator 74 is integrated by an integration circuit 76, the output of which is the weight for the associated channel. This weight is multiplied by the correlation value from the primary correlators at multiplier 78, and the output of the channels as defined thereby is supplied to a summer 80. The output of the summer is applied to a differential summer 82 which differentially sums the output of summer 80 with a training signal, here indicated by the number "1." The number "1" corresponds to the highest weight in the system. The output of the differential summer 82 is multiplied by the constant m which determines the loop gain and thus the rapidity of the adaptive response. The output of multiplier 84 is the specialized error signal E which is applied to each of the individual additional correlators. The PN code is illustrated to the left of the correlator 14 and phase-delayed replicas $C_0$, $C_1$, and $C_2$ are illustrated in FIG. 4 as being delayed by one chip or the smallest time period between changes in the code.

In one embodiment, initially with zero weights in all of the channels, the error signal is high, because the output of summer 80 will be zero. When this is subtracted from the training signal, i.e., the number 1, E will be equal to 1, ignoring the gain factor, m. Assuming the outputs of all correlators 72 have zero average value, and assuming E equals 1, then the correlation at each additional correlator is zero and the integrators do not have a signal to integrate. Upon signal correlation in one of the channels, the correlation values from the corresponding additional correlators increase. This value is integrated at the associated integrator, and the weight for this particular channel is increased. With an increase in weight for the channel, the output of summer 80 increases which decreases this channel's component of the error signal E. However, the decrease in correlation value from these correlators does not affect the other associated integrators, especially the one which has already integrated up to a predetermined weight value based on a high correlation in the respective channel. The reason that the other channels are unaffected is because of the additional correlation in each channel which causes the channel to respond only to that channel's component in the error signal.

The weights produced by this system are driven to a maximum in the correlation channel having the greatest degree of phase alignment with the incoming PN code, while the weights of the other channels tend toward zero. This situation is sensed by a detector 90 which establishes the channel associated with the closest in-phase replica. The identity of this channel is ascertained in one embodiment by a matched filter to be described hereinafter, with lock-up being achieved when the weights of all but one channel are at a minimum, and the output from the in-phase channel (or channels) is at some maximum as determined by the weight for this channel.

The overall operation of the adaptive weight-forming network attached to each prime correlator output is to make the weighted sum of the correlator outputs as close as possible to the training signal, in a least mean square error sense. The specialized error signal is a measure of the error between the weighted sum of the prime correlators and the training signal.

The additional correlators associated with each channel measure any component in the specialized error that is due to the output of that correlator. Each weight is adjusted by closed-loop action to minimize the contribution of that channel to the specialized error signal.

To summarize the evolution of the correlator weights, assume all weights are initially zero at the time the signal plus noise are applied to the system. Initially the weighted sum of the correlator outputs is zero and after subtraction from the training signal, the specialized error signal is $+1$. When this error signal is multiplied by the primary correlator outputs in the additional correlators, a zero average value results in all channels but the one aligned with the signal. The aligned channel, however, has a constant component in its output due to correlation with a phase-aligned reference. When this is multiplied by the specialized error signal, the average value is positive. This input to the integrator increases the output value for the integrator and thus the weight associated with the aligned channel. The other channels which are unaligned with the signal have an output which is uncorrelated with the specialized error signal and so the outputs of the associated integrators stay near zero.

In an alternative embodiment, the initial weights may be all set to $+1$ at the moment the signal plus noise are applied to the system. In this case, the specialized error signal has a component proportional to the negative of the noise coming out of each correlator. When this component is multiplied by the noise coming out of the correlator, a negative average value results which drives the output of the integrator down, reducing the weight for that channel and thus reducing the noise component in the specialized error signal due to that channel.

The channel which is aligned with the signal also has noise associated with it, and this tends to depress the weight. However, there is also a steady component due to signal correlation, and this component in the specialized error signal tends to raise the weight for the aligned channel.

More specifically, for initial weights equal to "1" for each channel, for correlation channels not aligned with the signal, the initial prime correlator value is predominantly noise, e.g. a random fluctuating signal. This noise (N) is multiplied by the initial channel weight (e.g. "1") and since $1 \times N = N$, N is subtracted from the training signal (e.g. $1 - N$). Thus a sign-reversed or negative version ($-N$) of the correlator output noise exists as a component of the specialized error signal. When the prime correlator output N is multiplied at the additional correlator by the error signal, the result ($N \times -N$) is a negative number that tends to drive the integrator output and channel weight to a lower value. Note each additional correlator recognizes its own noise component since the additional correlator mulpilies that negative component ($-N$) by the original positive version (N) to obtain a negative average value ($-N$) to drive the associated integrator. The further off the weight in the channel, the higher the additional correlation and the higher the negative average value; thus the quicker the reduction of the initial "1" weight to zero.

For a correlator channel aligned with the signal, the initial prime correlator output is a "one" plus additive noise $(1+N)$. This is multiplied by the initial channel weight (e.g. "1") and $1+N$ is subtracted from the training signal ("1") to leave a negative noise $(-N)$ which initially depresses this channel weight. Now the weight is no longer "1." When this lower weight is subtracted from "1," the training signal, the result is a net positive signal. Thus a steady value equal to the aligned channel weight plus additive noise exists as a component of the error signal. When the prime correlator output is multiplied by this error signal, the result (e.g. $1+\text{noise}\times 1-\text{noise}$) is a positive number that tends to increase the integrator output and channel weight to a larger number.

The system described is an adaptive system in that the noise in each channel is measured by virtue of the combination of the additional correlator and the associated integrator. The integration time of the integrators is shorter than that associated with delay-locked loops such that both acquisition and tracking lock-up is established in a very short period of time without a priori knowledge of the characteristics of the incoming signal.

Having identified the channel corresponding to that having a replica which is in phase with the incoming signal, in one embodiment the entire detector portion of the system is reconfigured, such that the identified channel becomes the center channel with equal numbers of advanced and delayed replicas on either side. This is easily accomplished by utilizing a shift register for the replica generation and by altering the phase of the clock driving the shift register. In this manner, the in-phase replica may be shifted so that it appears at the center tap for the register, in which case equal numbers of advanced and retarded replicas will be available from the other taps of the shift register. However once the detector characteristic is centered on the in-phase channel, it is incumbent upon the system to provide the previously ascertained weights to the appropriate channels. These previously ascertained weights are those which prevailed at the time of lock-up and, if digital integrators are utilized, it is merely a bookkeeping chore in which the addresses of the weights are altered so that the appropriate weights appear in the appropriate channels as the channels are being shifted so as to center the in-phase replica channel. This rearrangement of the weights may be conventionally accomplished by an $N\times N$ switch 34 such that any weight, $W_{OUT}$, can be switched into any other weight. In short, all possible permutations of the weights can be realized by this switch. Thus the output of the matched filter identifying the in-phase channel not only controls phase shifter 20, it also controls switch 34. Once the in-phase channel is identified, its weight is shifted to the center channel and all other adjacent weights are shifted to the corresponding channels adjacent to the central channel.

Since the shifting of the code generator can be almost instantaneous, replica selection circuit 22 may merely select the center tap of the shift register, with a suitable delay being provided to permit the phase shifting for the code generator. Thus the center tap will always represent the in-phase replica which is then utilized in the decoding of the incoming spread spectrum signal. Alternatively the replica selection may be accomplished by selecting the indicated channel initially and then switching the shift register taps to select the center channel, $C_{N/2}$.

Figure 5:
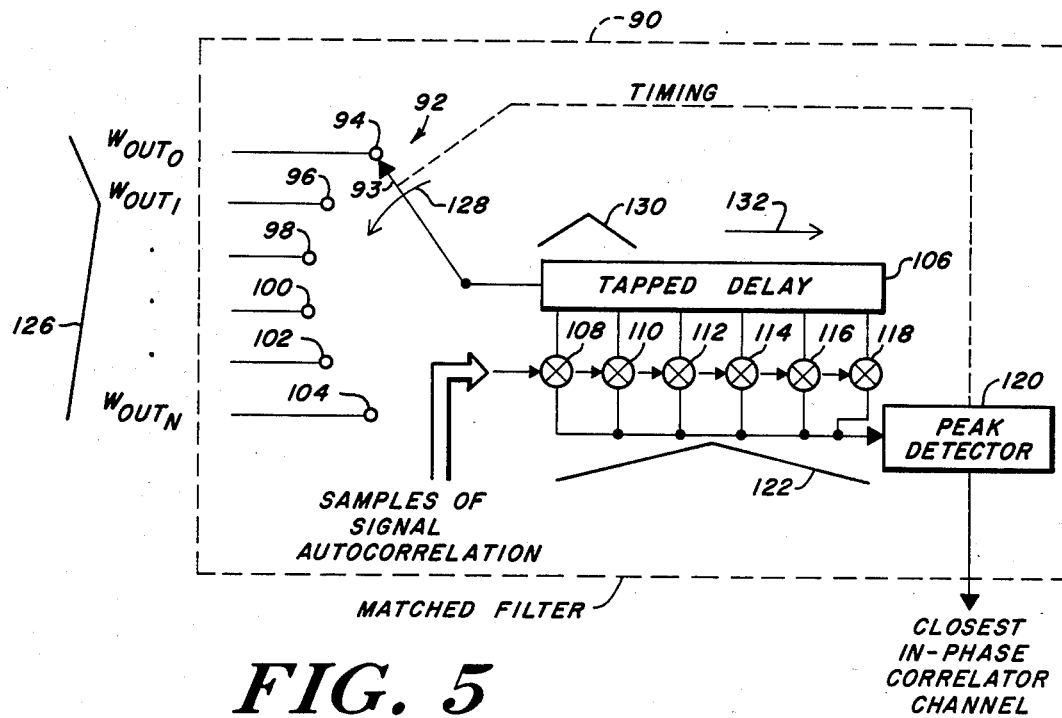
FIG. 5 is a schematic and waveform diagram illustrating a matched filter for use in the system of FIG. 3.

Referring now to FIG. 5, a schematic and pictorial diagram of a matched filter for use in the subject system illustrates a rotary scanning switch 92 having an arm 93 and input terminals 94-104 to which the weights from correlator channels $C_0-C_N$ are applied. These are respectively $W_{OUT_0}$, $W_{OUT_1}$, ... $W_{OUT_N}$. The switch arm 93 is coupled to a tapped delay line 106 having a number of outputs equal to the number of inputs to switch 92. The tapped delay line in effect takes the weights from the channels and moves the corresponding waveform down the delay line in a "slide-by" mode of operation. Each of the delay line outputs includes a correlator in the form of a multiplier, with multipliers 108-118 being connected as illustrated. The summed outputs of the multipliers are provided to a peak detector 120 which establishes when the slid-by waveform comes into closest correspondence with an auto-correlation waveform corresponding to the input signal auto-correlation, and thus which channel most nearly approximates an in-phase channel.

For a direct sequence input signal, the other inputs to the multipliers are provided with a series of weights defining a triangular waveform 122. This waveform is the auto-correlation of a direct sequence signal.

For instance, if the weight of $W_{OUT_1}$ indicates an in-phase correlator channel, then the magnitude of the signal at input 96 would be high, as indicated by the peak of waveform 126. The weights to either side of the in-phase waveform decrease as indicated illustratively by waveform 126, at least in the idealized case. As the arm of switch 92 rotates in the direction of arrow 128, the waveform in essence illustrated by 130, travels down the tapped delay line as illustrated by arrow 132, where it is multiplied by the signal auto-correlation values. Peak detector 120 keeps track of the results of the outputs of multipliers 108-118 in timed relationship to the sweep of the arm of switch 92. During the slide-by of waveform 130, there will be a peak in the outputs from one of the multipliers, and the peak detector establishes the time of this match. The time of the match correlates to the channel which most nearly corresponds to an in-phase channel. In actual practice, several adjacent channels may have relatively high correlation values, and thus relatively high weights. By correlating the output weights with the signal auto-correlation, the channel having the highest probability of being in phase is identified, even though other channels may have high correlation values. Thus what the matched filter is looking for is a set of weighting outputs corresponding to a triangular waveform, the filter rejecting spurious signals not in conformity with the predetermined waveform. The matched filter is therefore exceptionally effective in eliminating extraneous signals and predicting the closest in-phase correlator channel when more than one channel has a high correlation value.

Figure 6:
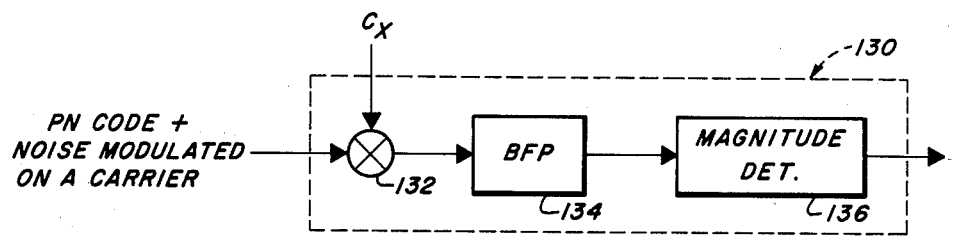
FIG. 6 is a schematic diagram of a replacement circuit for use in the system of FIG. 3 for noncoherent operation of the subject system.

Referring now to FIG. 6, for noncoherent operation where the carrier frequency and phase is unknown, each multiplier 72 of FIG. 3 is replaced by the circuitry in dotted box 130. Here a signal representing the PN code plus noise modulated on the carrier is applied to a multiplier 132 supplied with the appropriate replica, $C_x$. The output of multiplier 132 is coupled to a bandpass filter 134, the band width of which is set to equal the data rate. The output of bandpass filter 134 is applied to a magnitude detector 136, the output of which is applied to the remainder of the circuit of FIG. 3. The output of the magnitude detector is a time-varying signal proportional to the correlation as a function of time.

Having above indicated a preferred embodiment of the present invention, it will occur to those skilled in the art that modifications and alternatives can be practiced within the spirit of the invention. It is accordingly intended to define the scope of the invention only as indicated in the following claims.

What is claimed is:

1. Apparatus including correlators for acquiring and tracking a spread spectrum signal having a predetermined spread spectrum code so as to suppress noise in correlators not containing the signal comprising:
   means for receiving said spread spectrum signal;
   a set of prime correlators each defining a correlator channel and each having two inputs, one input thereof coupled to said receiving means such that said prime correlators are connected in parallel thereto;
   means for supplying a set of phase delayed replicas of said code to the other inputs of said prime correlators;
   means for ascertaining the degree of correlation in each of said prime correlators and for generating an adaptive correlation channel weight which rises with increasing correlation and decreases with decreasing correlation in the corresponding channel thus to provide continuously variable weights;
   means for multiplying the output of each prime correlator with the corresponding adaptively generated weight;
   means coupled to the outputs of said multipliers for developing an error signal;
   means for applying said error signal to said means for ascertaining the degree of correlation in each of said prime correlators such that said weight rises and decreases can be generated; and
   means for identifying by the channel weights which correlation channel is the most likely to have an associated replica in-phase with said spread spectrum code.

2. The apparatus of claim 1 wherein said degree of correlation ascertaining and adaptive weight generating means includes:
   an additional correlator for each channel, each additional correlation having two inputs, one input of each additional correlator being coupled to the output of an associated prime correlator; and
   an integrator coupled to the output of each additional correlator for generating the adaptive correlator channel weight coupled to the associated multiplying means;
   and wherein said error signal generating means includes:
   means for summing the outputs of all said multiplying means;
   means for subtracting the sum developed thereby from a predetermined signal representing perfect correlation, thereby to form said error signal; and
   means for coupling said error signal to the other input of each additional correlator.

3. The apparatus of claim 2 and further including means for initializing all channel weights to the maximum weight.

4. The apparatus of claim 2 and further including means for initializing all channel weights to zero.

5. The apparatus of claim 2 wherein said replica supply means includes:
   a shift register having a center tap;
   a clock coupled to said shift register; and,
   means responsive to the identification of an in-phase correlation channel for altering a clocking parameter to center the in-phase replica to the center tap of said shift register, said centered replica being supplied to decode said spread spectrum signal.

6. The apparatus of claim 5 and further including means for ascertaining the weights in all channels when said in-phase channel is identified and for reassigning said weights to the corresponding channels with the generation of said in-phase replica at the center tap of said shift register.

7. The apparatus of claim 1 wherein said receiving means has as an output thereof an input signal coupled to said prime correlators, and wherein said identifying means includes means for generating an autocorrelation signal corresponding to the autocorrelation of the predetermined spread spectrum code and a matched filter having as inputs thereto the weights from all of said channels, said matched filter including as inputs thereto said autocorrelation signal such that the wave form associated with said channel weights is correlated with autocorrelation signal.

8. The apparatus of claim 7 wherein the wave form of said input signal autocorrelation is triangular.

9. The apparatus of claim 7 wherein said matched filter includes:
   means for sequentially sampling said channel weights in a timed sequence;
   a tapped delay line having an input coupled to said sequential sampling means; and
   a number of two-input multipliers, each having one input coupled to a different one of said taps and each having as a second input thereto a weight corresponding to a preselected portion of said input signal autocorrelation, whereby said channel weights are slid by said signal autocorrelation in accordance with the timing of said sequential sampling means.

10. The apparatus of claim 9 wherein said matched filter includes peak detector means for ascertaining at what time in said slide by the outputs of said last mentioned multipliers are at a maximum, thereby to identify an in-phase channel.

11. A method for decreasing the signal acquisition and tracking time for parallel correlator spread spectrum receivers comprising the steps of ascertaining the degree of correlation for each of said correlators and thus the degree of correlation for the associated correlator channel, generating a weight directly proportional to the degree of correlation in the corresponding channel, said weight being continuously variable, and multiplying this output of each of said correlators with the corresponding generated weight, whereby said parallel correlator spread spectrum receivers are provided with adaptive continuously variable weights which narrow the receiver response upon an initial in-phase correlation in any one of said channels, thereby to suppress noise in correlators not containing the signal.

* * * * *